(12) United States Patent
Wieser

(10) Patent No.: US 6,428,256 B2
(45) Date of Patent: Aug. 6, 2002

(54) ATTACHMENT ELEMENT FOR AN ANCHOR ROD

(75) Inventor: Jürgen Wieser, Kaufering (DE)

(73) Assignee: Hilti Aktiengesellschaft, Schaan (LC)

( * ) Notice: Subject to any disclaimer, the term of this patent is extended or adjusted under 35 U.S.C. 154(b) by 0 days.

(21) Appl. No.: 09/808,250

(22) Filed: Mar. 14, 2001

(30) Foreign Application Priority Data

Mar. 15, 2000 (DE) .......................................... 100 12 645

(51) Int. Cl.[7] ................................................ F16B 13/06
(52) U.S. Cl. ........................................ 411/60.3; 411/55
(58) Field of Search ...................... 411/55, 57.1, 60.1, 411/60.2, 60.3, 63–68

(56) References Cited

U.S. PATENT DOCUMENTS

| 282,501 | A | * | 8/1883 | Cornell |
| 1,033,447 | A | * | 7/1912 | Mower |
| 1,164,322 | A | * | 12/1915 | Yeatman |
| 1,469,688 | A | * | 10/1923 | Karitzky |
| 4,614,471 | A | * | 9/1986 | Mauritz |
| 4,640,654 | A | * | 2/1987 | Fischer |
| 4,893,973 | A | | 1/1990 | Herb |
| 4,983,082 | A | * | 1/1991 | Mark |
| 5,919,017 | A | | 7/1999 | Mayr |
| 6,282,999 | B1 | * | 9/2001 | Hite |

FOREIGN PATENT DOCUMENTS

| CH | 60291 | * | 3/1912 |
| CH | 0586356 | | 3/1977 |
| DE | 2552435 | | 5/1977 |

* cited by examiner

Primary Examiner—Flemming Saether
(74) Attorney, Agent, or Firm—Sidley Austin Brown & Wood, LLP

(57) ABSTRACT

An attachment element for an anchor rod (14) including a substantially cylindrical expansion member (1) having an axial bore (8), and one-piece expandable member (2) extending, at least partially, into the axial bore (8) of the expansion member (1) without a possibility of disengagement from the expansion member (1) and having, at least along a portion of its longitudinal extent, a conical section tapering in a direction opposite to a setting direction (S) of the anchor rod (14), an axial bore (4), and at least two elongate slots (11).

6 Claims, 2 Drawing Sheets

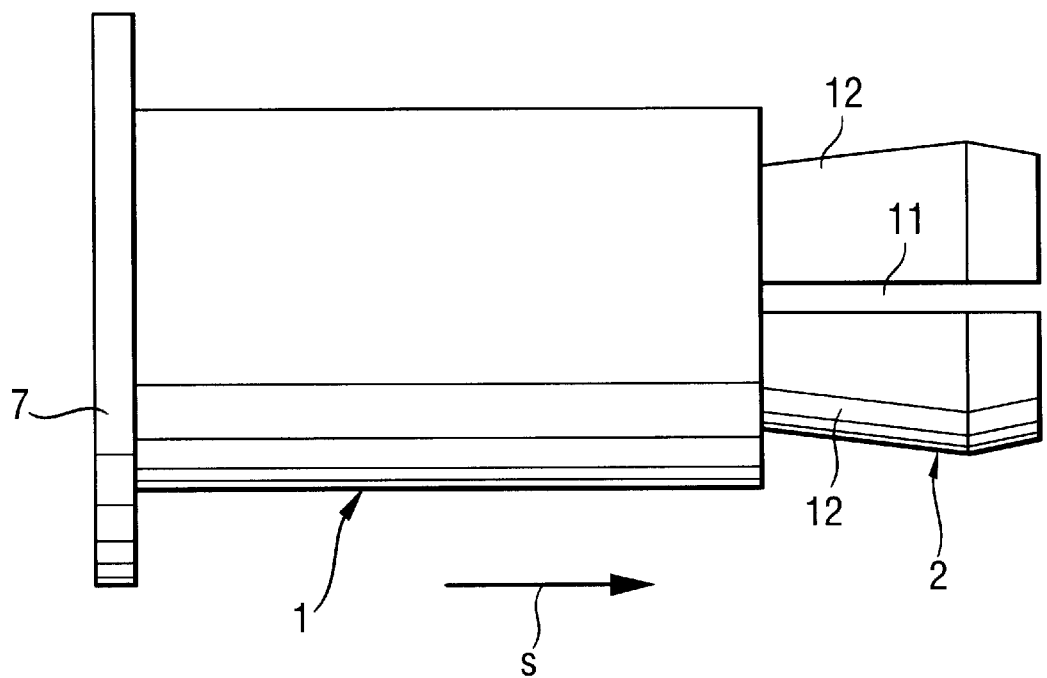

ATTACHMENT ELEMENT FOR AN ANCHOR ROD

BACKGROUND OF THE INVENTION

1. Field of the Invention

The present invention relates to a attachment element for an anchor rod including a substantially cylindrical expansion member having an axial bore, and a one-piece expandable member extending, at least partially, into the axial bore of the expansion member without a possibility of disengagement from the expansion member and having at least along a portion of a longitudinal extent thereof, a conical section tapering in a direction opposite to a setting direction of the anchor rod.

2. Description of the Prior Art

The attachment elements of the above-described type become anchored by the expandable member being pulled into the expansion member, with the expansion member being supported either directly or via a spacing sleeve on a thrust bearing support of a bolt element. The expandable member can be connected with the bolt element by a threaded connection.

German Publication DE 197 40 823A1 discloses an attachment element having a substantially cylindrical expansion member provided with an axial bore, and an expandable member having, at least along a portion of its longitudinal extent, a conical section tapering in a direction opposite to the setting direction. The expandable member is formed of a plurality of clamp segments which are held together, with a possibility of radial elastic expansion, by an O-ring and which extend into the axial bore of the expansion member. Upon insertion of an anchor rod, which is provided with an appropriate outer profile, the segments expand radially outwardly, with the O-ring elastically pressing the segments against the outer surface of the outer profile of the anchor rod. Upon application of a tensile load to the anchor rod, the expandable element, which is formed of separate segments, is pulled further into the expansion member. Due to the conicity of the expandable member, which is defined by a cone tapering in direction opposite the setting direction, the expansion member expands radially, upon the expandable member being pulled thereinto.

The drawback of the attachment element which is disclosed in DE 197 40 823A1, consists in that the anchor rod need be precisely centered with respect to the expandable member to insure the radially outward movement of all of separate segments. Otherwise, tilting of the expandable member can occur which makes the insertion of the anchor rod practically impossible which, in turn, make impossible the expansion of the attachment element. In addition, the diameters of the anchor rod and the expandable member should be precisely matched because if the segments are located to close to the center of the expandable member, insertion of the anchor rod can be effected only with much difficulties.

Another drawback of the known attachment element consists in that the anchor rod need be provided with an appropriate outer profile to provide a connection of the anchor rod with the expandable member which is capable to withstand large loads.

An object of the present invention is to provide an attachment element for an anchor rod which would not hinder the insertion of the anchor rod and would insure self-centering of the anchor rod upon insertion.

Another object of the present invention is to provide an attachment element which would not require that the anchor rod be provided with an outer profile for establishing a connection capable of withstanding high loads.

A further object of the present invention is to provide an attachment element which can be simply and economically produced.

SUMMARY OF THE INVENTION

This and other objects of the present invention, which will become apparent hereinafter, are achieved by providing an attachment element of the type described above in which the expandable member has a central bore and at least two slots extending along at least the front portion of the expandable member.

The expandable member is formed as a one-piece member and, because of this, is centered in the expansion member even before the attachment member is set in a bore of a constructional component. This insures insertion of the anchor rod without any problem. The slots, which are provided in the front section of the expandable member, divide the expandable member in that section in a plurality of elastically radially expandable segments, which are expanded radially outwardly upon the insertion of the anchor rod. When a load, which acts in a direction opposite to the setting direction, is applied to the anchor rod, and the anchor rod is pulled out of the bore, the elastically expandable segments are pressed against the outer surface of the anchor rod, whereby frictional forces, which act between the segments and anchor rod, increase. Upon application to the anchor rod of a force acting in a direction opposite the setting direction, the frictional forces acting between the elastically expandable segments and the anchor rod cause pulling of the expandable member into the axial bore of the expansion member, with the conical section of the expandable member expanding the expansion member radially outwardly. Forming the expandable member as a one-piece member simplifies its manufacture and facilitate the assembly of the attachment element.

The bore of the expandable member advantageously tapers in the setting direction. As a result, the radial pressure applied by the elastic segments to the anchor rod increases upon further insertion of the anchor rod as the segments need to perform a longer pivot movement.

Advantageously, the expandable member has at its end facing in a direction opposite to the setting direction, an opening a diameter of which at least correspond to an inner diameter of the axial bore of the expansion member. This insures centering of the anchor rod, upon its insertion, in the axial bore of the expandable member. Preferably, the diameter of the anchor rod is smaller than the diameter of the axial bore of the expandable member, whereby the insertion of the anchor rod can be effected without any hindrance.

Advantageously, the expandable member has, on its outer circumference a shoulder facing in the setting direction and cooperating with a mating shoulder provided on the expansion member which prevents disengagement of the expandable member from the expansion member. The provision of the stop shoulder on the outer circumference of the expandable member also prevents sliding of the expandable member out of the expansion member upon the insertion of the anchor rod. Providing cooperating shoulders on the expansion and expandable members also facilitates the assembly of the attachment member. The region of the axial bore of the expandable member, which adjoins the stop shoulder, can be made conical. This provides for additional expansion of the expansion member in a bore of a constructional component.

The axial bore of the expandable member has, at least along a portion of its length, a shaped profile engagable with a corresponding profile of the anchor rod. This provides, in addition to a forcelocking connection of the expandable member with the anchor rod, a formlocking connection therebetween, such a combination the connection can withstand much higher loads.

Preferably, the expandable member has, in the region of the elongate slots, at least one hinge. This improves swinging characteristic of the expandable segments. In addition, the provision of the hinge permits to obtain a better relationship between the diameter of the axial bore of the expandable member and the length of the elongate slots. The hinge, preferably, is produced by weakening of the material.

Advantageously, the weakening of material is effected by forming an inner groove in the wall of the bore of the expandable member. This insures economical manufacturing of the expandable member. The weakening of material can also be achieved by using a material with a high elasticity.

Preferably, the expansion and expandable member are formed of a plastic material, in particular, by injection molding. This, on one hand, insures an economical manufacturing of the attachment element and, on the other hand, permits to form the hinge by using elastic material.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS:

The drawings show:

FIG. 2 a side view of the inventive attachment element shown in FIG. 1.

DETAILED DESCRIPTION OF THE PREFERRED EMBODIMENT

Figure 1:
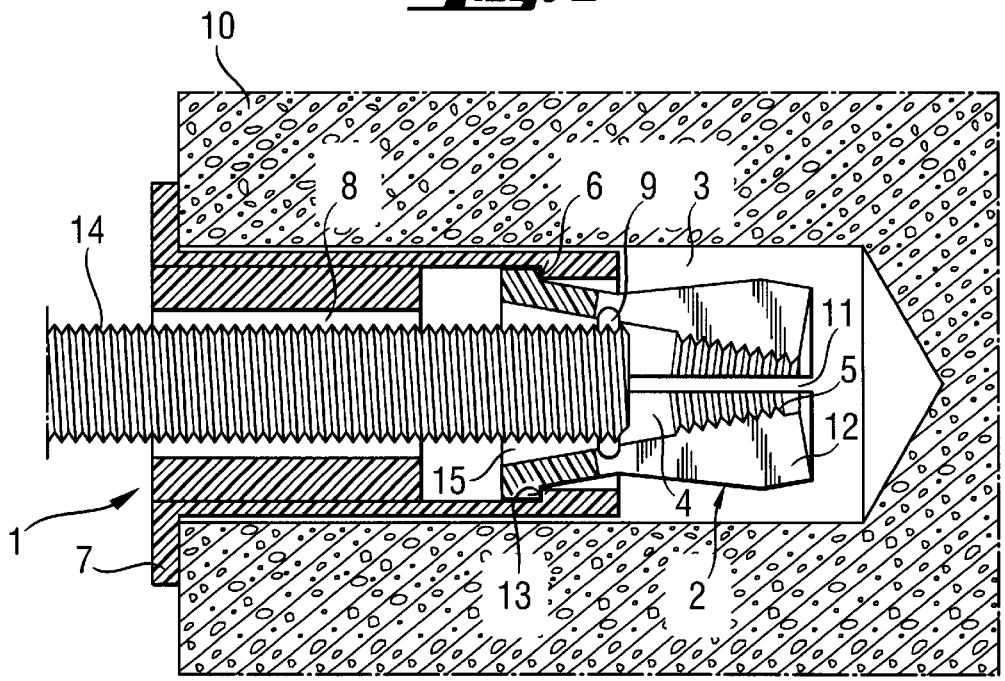
FIG. 1 cross-sectional view of an attachment element according to the present invention inserted in a bore in a constructional component with an anchor rod being introduced into the bore of the expansion member of the attachment element.
Figure 1A:
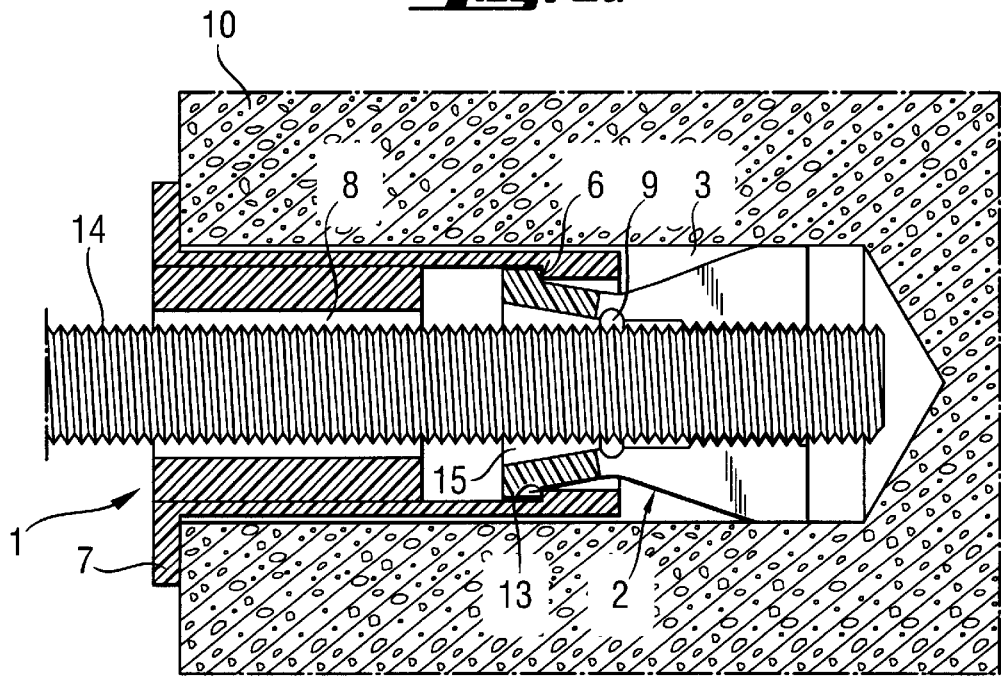
FIG. 1a across-sectional view similar to that of FIG. 1 but with the anchor rod in its end position.

An attachment element for an anchor rod 14 according to the present invention, which is shown in FIGS. 1, 1a and 2, has a cylindrical expansion member 1 with an axial bore 8 and a partially extending into the bore 8 expandable member 2.

The expandable member 2 has a conical and region extending in the setting direction S and tapering in a direction opposite to the setting direction S. A substantially cylindrical section extending in the direction opposite the setting direction S, adjoins the conical end section. The expandable member 2 has a central bore 4 having, in its end region facing in, the setting direction, an inner profile 5. A stop shoulder 6, which faces in the setting direction S, is provided in the end region of the expandable member 2 remote from the front, facing in the setting direction S, end of the expandable member 2.

The expansion member 1 has, in its region remote from the expandable member 2, a flange 7 which defines the setting depth of the expansion member 1. As shown in FIG. 1, the flange 7 lies on a surface of a constructional component 10 in the bore 3 of which the attachment element is set. At its end opposite the flange 7, the expansion member 1 has a shoulder 13 cooperating with the stop shoulder 6 of the expandable member 2. The shoulder 13 limits the displacement of the expandable member 2 in the setting direction. At its end opposite the flange 7, the expansion member 1 surrounds the substantially cylindrical section of the expandable member 2.

The expandable member 2 has, in its region coinciding with the end of the expansion member 1 facing in the setting direction S, a circumferential groove 9 which serves as a hinge between the cylindrical section of the expandable member 2 and the expandable section of the expandable member 2 which is formed of a plurality of segments 12 separated by longitudinal slots 11. At its end facing in the direction opposite to the setting direction, the expandable member 2 has an opening 15 the diameter of which is larger than the inner diameter of the bore 8 of the expansion member 1. This provides for an automatic centering of the anchor rod 14 with respect to the opening 15 when it is introduced into the expansion member 1 and the expandable member 2.

The diameter of the bore 4 of the expandable member 2 in the region of the expandable member 2 facing in the setting direction S is smaller than the outer diameter of the anchor rod 14. Upon being inserted into the expandable member 2, the anchor rod 14 displaces the segments 12 radially outwardly about a pivot axis defined by the inner groove 9. When a force, which acts in a direction opposite to the setting direction S, it applied to the anchor rod 14, the segments 12 apply pressure to the outer surface of the anchor rod 14, forming a forcelocking connection between the expandable member 2 and the anchor rod 14. Thus, when the anchor rod 14 is pulled out, the expandable member 2 is likewise pulled out, in the direction opposite the setting direction, into the bore 8 of the expansion member 1. The conical region of the expandable member 2, which tapers in the direction opposite to the setting direction S, expands the expansion member 1. This further enhance anchoring of the dowel in the bore 3 of the constructional component 10 (FIG. 1a).

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. An attachment element for an anchor rod (14), comprising a substantially cylindrical expansion member (1) having an axial bore (8); and one-piece expandable member (2) extending, at least partially, into the axial bore (8) of the expansion member (1) without a possibility of disengagement from the expansion member (1) and having, at least along a portion of a longitudinal extent thereof, a conical section tapering in a direction opposite to a setting direction (S) of the anchor rod (14), an axial bore (4), and at least two elongate slots (11), wherein the expandable member (2) has, in an end region of the elongate slots (2) facing in a direction opposite the setting direction (S), at least one hinge (9), wherein the hinge is formed by weakening of material, and wherein the hinge is formed by an inner groove (9) provided in the wall of the bore (4) of the expandable member (2).

2. An attachment element according to claim 1, wherein the bore (4) of the expandable member (2) tapers in the setting direction (S).

3. An attachment element according to claim 1, wherein the expandable member (2) has, at an end thereof facing in a direction opposite to the setting direction (S), an opening (15) a diameter of which at least correspond to an inner diameter of the axial bore (8) of the expansion member (1).

4. An attachment element according to claim 1, wherein the expandable member (2) has, on an outer circumference thereof, a shoulder (6) facing in the setting direction (S) and cooperating with a mating shoulder (13) provided on the expansion member (1), whereby disengagement of the expandable member (2) from the expansion member (1) is prevented.

5. An attachment element according to claim 1, wherein the bore (4) of the expandable member (2) has, at least along a portion of a length thereof, a shaped profile (5).

6. An attachment element according to claim 1, wherein both the expansion and expandable member (1, 2) are formed of a plastic material.

\* \* \* \* \*